3,512,926
PROCESS FOR PURIFICATION OF SODIUM ALUMINATE LIQUORS
Henri Antoine Mercier and Joseph Cohen, Gardanne, France, assignors to Pechiney-Compagnie de Produits Chimiques et Electrometallurgiques, Paris, France
No Drawing. Filed May 19, 1967, Ser. No. 639,662
Claims priority, application France, June 1, 1966, 63,620
Int. Cl. C01f 7/02
U.S. Cl. 23—52     1 Claim

ABSTRACT OF THE DISCLOSURE

The invention comprises the treatment of sodium aluminate liquors, as from the extraction of aluminum from bauxite, by precipitation of impurities in the presence of a freshly prepared manganese dioxide, with or without calcium carbonate, in which the manganese dioxide is present in the ratio of 0.03 to 0.15 gram of the tetravalent manganese per liter of liquor and in which the carbonate, when present, is present in an amount within the range of 0.1 to 0.3 gram per liter and in which the content of aluminum oxide equivalent per liter is about ⅛ to ¼ kg. and in which the amount of iron impurity may be within the range of 6 to 50 mg. and the amount of titanium impurity may be within the range of 2 to 6 mg. per liter.

---

This invention relates to a process for purification of industrial sodium aluminate liquors to eliminate most of the impurities present, either in soluble or in colloidal form.

The process of this invention is employed to particular advantage in the production of alumina by the alkaline treatment of bauxites, known as the Bayer process.

Reaction of the hot concentrated soda with the bauxite produces a strongly alkaline solution of sodium aluminate in which iron oxide is present in suspension. This mixture is usually diluted with water at the outlet end of the reactor to reduce the concentration of soda. Thereafter it is decanted, filtered at a temperature of about 100° C. and finally hydrolyzed by dilution with water to precipitate aluminum hydroxide. The filtered aluminate solution contains impurities in solution in the form of ions of iron, titanium, lead, copper, etc. Some of these elements, particularly iron and titanium, are highly undesirable for most of the purposes for which alumina is used, especially in the production of aluminum. The amount of soluble iron present, expressed as $Fe_2O_3$ is usually between 6 to 50 mg. per liter and the amount of titanium present, expressed as $TiO_2$, is around 2 to 6 mg. per liter. These quantities, and those in which other impurities are present, are obviously dependent upon the composition of the original bauxite.

Various processes have been proposed for reducing the amount of dissolved iron present in sodium aluminate liquors, including, in particular, the oxidation of the aluminate solutions either with air or with oxidizing agents. Some of the oxidizing agents can form insoluble complex compounds with the iron, such as the alkali metal or alkaline earth metal permanganates. The results hitherto obtained are inadequate and uncertain and they are governed to a large extent by other impurities present in the aluminate solution.

The use of the permanganate as an oxidizing agent for iron has two main disadvantages, namely:

(1) The separation, as by decantation, filtration or centrifuge of the insoluble compounds is difficult. It necessitates the addition of large amounts of a decantation or filtration promoter, usually lime, which gives rise to a substantial loss of alumina in the form of calcium aluminate.

(2) The introduction of soluble manganese compounds results in a fairly large residual quantity of manganese in the solution. This manganese precipitates during hydrolysis of the aluminate and finds its way into the aluminum hydroxide.

It is an object of this invention to provide a method for the purification of sodium aluminate liquors for the elimination of impurities and for the production of an aluminum oxide which is relatively free of such impurities; in which the removal of impurities can be achieved in a simple and efficient manner; in which the means for the removal of impurities does not operate to introduce other undesirable components into the solution or the alumina secured therefrom; and in which impurities are separated in a form which enables recovery of commercially valuable components thereof.

In accordance with the practice of this invention, freshly precipitated manganese dioxide is used as the purifying agent in an amount of at least 0.03 gram of manganese per liter of sodium aluminate and preferably in an amount within the range of 0.05 to 0.15 gram per liter, or when calculated on the equivalent of $Al_2O_3$, the amount of manganese dioxide is at least 0.18 and preferably 0.3 to 0.9 gram per kg. of $Al_2O_3$ equivalent in the liquor. In accordance with another aspect of the invention, it has been found that the addition of a small quantity of natural or precipitated calcium carbonate to the aluminate solution being purified increases the rate at which impurities are precipitated. An effective quantity of calcium carbonate is between 0.1 and 0.3 gram per liter of solution. In order to avoid hydrolysis of the aluminate solution, purification is carried out at a temperature below its boiling point, and preferably at a temperature within the range of 90–105° C. The time taken to complete purification varies somewhat with the method that is used but it usually takes between one and one-half to four hours.

To provide the freshly precipitated manganese dioxide, almost any of the compounds of manganese in which manganese has a valency below 4 can be used as the manganese source or donor, including oxides, hydroxides, soluble salts, carbonates or even industrial residues containing manganese oxide, such as the manganiferous residues of steel and iron making. The quantity of reactant should correspond to at least 0.03 gram of manganese per liter of aluminate solution to be purified and it is preferred to make use of an amount within the range of 0.05 to 0.15 gram of manganese per liter of solution. It is preferred to make use of air as the oxidizing agent with emulsification of the air in the solution by means of a suitable apparatus. Gases containing a higher concentration of oxygen to pure oxygen may be used instead of air. Oxidation may also be carried out with soluble oxidizing agents such as hypochlorites, oxygenated water, permanganates, sodium dioxide and the like.

Where a powerful oxidizing compound is used, the quantity added should be calculated in a manner such that the extent to which the manganese is oxidized converts the manganese to a valency of four.

In accordance with a preferred embodiment of the invention, the aluminate solution has added to it manganese compounds which, by reaction with the alkaline solution, produce hydroxides having a valency below four and which are subsequently oxidized to convert most of the manganese to a tetravalent manganese. However, formation of the manganese dioxide precipitate in the aluminate solution is not imperative since modifications may be employed without appreciable effect on the results. For example, the manganese compound may be added only to a fraction of the solution to be purified and oxidized therein whereby the resulting suspension is poured into the remainder of the aluminate solution for the described reaction. In the alternative, a soluble low valency manganese can be dissolved in water and oxidized and either the suspension or only the precipitate introduced into the aluminate solution. The active manganese dioxide precipitate can also be prepared by reducing a manganese containing compound having a valency higher than four, such as a permanganate, and introducing the resulting product into the liquor to be purified. Experience has indicated that natural manganese dioxide ores, such as pyrolusite, are inactive.

When an aluminate solution derived from the alkaline treatment of bauxites is used, the manganiferous compound, the calcium carbonate and oxidizing agent are preferably introduced into the liquor issuing from the decanter before filtration. Under these circumstances, there is no need for any additional filtration in the working cycle. It is also possible to carry out the described purification without previous filtration. In such event, an additional filtration step is necessary in order to eliminate the precipitate although, on the other hand, recovery of the manganese and the impurities is made easier.

Purification by the process of this invention reduces the iron content of the sodium aluminate solution to less than 3 mg. per liter and it eliminates substantially all of the titanium present. The proportion of any other impurities, such as silica, copper, lead, gallium, etc. is greatly reduced and the soluble manganese content remains less than 1.5 mg. per liter. All of the impurities eliminated are present in the manganese dioxide precipitate separated by filtration. Manganese can be recovered form the precipitate, if desired, and others of the impurities of sufficient economic value may be recovered by processes well known to the skilled in the art.

The following examples are given by way of illustration, and not by way of limitation, of the practice of this invention. Example 1 is given by way of comparison to demonstrate that manganese hydroxide alone, without the oxidation phase, is ineffective. The results discussed in Examples 2 to 8 relate solely to iron as representative of the most difficult element to eliminate. Example 9 shows the results obtained with both iron and titanium in addition to demonstrating the consequences of the purification of an alumina obtained by hydrolyzing the aluminate solution purified by the process of this invention.

EXAMPLE 1

A filtered sodium aluminate solution for the commercial production of alumina from bauxites by the Bayer process is poured into a sealed vessel in the absence of air. The liquor has the following composition:

| | G./liter |
|---|---|
| Caustic $Na_2O$ | 165 |
| $Al_2O_3$ | 175 |
| $Fe_2O_3$ in solution | 0.020 |

0.344 g./liter of $MnCl_2.4H_2O$ and 0.200 g./liter of calcium carbonate are introduced into the solution and heated to 90° C. After three hours stirring, the $Fe_2O_3$ content is still 0.018 g./liter, showing that there has been no appreciable precipitation of soluble iron.

EXAMPLE 2

The test described in Example 1 is repeated, except that on this occasion a stream of oxygen is passed through the solution with the following results:

| | $Fe_2O_3$-contents (g./liter) | Mn-contents (g./liter) |
|---|---|---|
| After 30 minutes stirring | 0.007 | 0.0032 |
| After 1 hour stirring | 0.005 | 0.0026 |
| After 2 hours stirring | 0.004 | 0.0015 |

EXAMPLE 3

The test described in Example 1 is repeated, except that on this occasion air is introduced into the liquid with emulsification by means of a turbine impeller, with the following results:

| | $Fe_2O_3$-contents (g./liter) | Mn-contents (g./liter) |
|---|---|---|
| After 30 minutes stirring | 0.006 | 0.0017 |
| After 1 hour stirring | 0.0038 | 0.0017 |
| After 2 hours stirring | 0.0027 | 0.0010 |

Examples 2 and 3 show that the introduction of 0.1 g./liter of $Mn^{++}$-ions into the aluminate solution, followed by two hours oxidation with oxygen or air, removes 80 to 85% of the soluble iron and reduces the $Fe_2O_3$ content of the alumina to 20 p.p.m. The manganese content of the treated solution is around 7 p.p.m.

EXAMPLE 4

The only difference between the operation to which this example relates and the operation described in Example 3 is that a small quantity of "red sludge" is present in the solution. This is due to the fact that the aluminate solution used was decanted but not filtered. Accordingly, the quantity of red sludge in suspension is 0.2 g./liter. The liquor contains in solution:

| | G./liter |
|---|---|
| Caustic $Na_2O$ | 163 |
| $Al_2O_3$ | 176 |
| $Fe_2O_3$ in solution | 0.027 |

0.344 g./liter of $MnCl_2.4H_2O$ and 0.2 g./liter of $CaCO_2$ are introduced into this suspension, followed by oxidation with air in emulsion, with the following results:

| | $Fe_2O_3$-contents (g./liter) | Mn-contents (g./liter) |
|---|---|---|
| After 30 minutes stirring | 0.012 | 0.0025 |
| After 1 hour stirring | 0.0065 | 0.0015 |
| After 2 hours stirring | 0.0058 | 0.0012 |

This example shows that the presence of a relatively large quantity of insoluble iron in the form of red sludge reduces the effectiveness of the purifying treatment only very slightly because 78.5% of soluble iron is still eliminated, the final content being 33 p.p.m. of $Fe_2O_3$ based on alumina.

EXAMPLE 5

In this example use is made of Mn carbonate instead of $MnCl_2$ of Example 1. Despite the fact that it is insoluble in water, this salt reacts progressively with soda for conversion to the hydroxide. The liquor to be purified contained:

| | G./liter |
|---|---|
| Caustic $Na_2O$ | 165 |
| $Al_2O_3$ | 180 |
| $Fe_2O_3$ in solution | 0.027 |

0.2 g./liter of $MnCO_3$ and 0.2 g./liter of $CaCO_3$ were introduced into this solution, followed by oxidation at 95° C. with air in emulsion, with the following results:

| | $Fe_2O_3$-contents (g./liter) | Mn-contents (g./liter) |
|---|---|---|
| After 30 minutes stirring | 0.017 | 0.0024 |
| After 1 hour stirring | 0.012 | 0.0012 |
| After 2 hours agitation | 0.007 | 0.0010 |

It can be seen that the effectiveness of the manganese carbonate is only slightly less than that of the chloride. 75% of the dissolved iron was rendered insoluble, the quantity finally present in the alumina being 39 p.p.m. of $Fe_2O_3$.

EXAMPLE 6

Treatment is made of 1 liter of a solution containing 165 g. of $Na_2O$, 180 g. of $Al_2O_3$ and 0.016 g. of $Fe_2O_3$ in solution. 0.1 g. of $KMnO_4$ and 0.208 g. of $MnCl_2$ is introduced with 10 cc. of the solution. The mixture is then stirred in the absence of air for a period of 10 minutes. The color of the permanganate disappears, all the manganese become tetravalent. The suspension thus prepared is added to the other 990 cc. of liquid at 95° C., after which 0.2 g. of $CaCO_3$ is introduced into this mixture. The resulting suspension is then gently stirred in the absence of air, with the following results:

| | $Fe_2O_3$-contents (g./liter) | Mn-contents (g./liter) |
|---|---|---|
| After 1 hour stirring | 0.006 | 0.0012 |
| After 2 hours stirring | 0.004 | 0.0012 |

It is evident that this mode of procedure is entirely different from the conventional process of treating aluminate solutions with permanganate because the manganese is at a reduced valency when it is introduced into the solution. The result is more rapid than when oxidation is carried out with air. Most of the iron has been rendered insoluble within only 1 hour. After 2 hours, 75% of the soluble iron has been removed, the quantity finally left in the alumina being 22 p.p.m. of $Fe_2O_3$.

EXAMPLE 7

The conditions used are similar to those described in Example 5, except that a slightly more dilute aluminate liquor is used, having the following composition:

| | G./liter |
|---|---|
| Caustic $Na_2O$ | 151 |
| $Al_2O_3$ | 164 |
| $Fe_2O_3$ in solution | 0.03 |

0.344 g./liter of $MnCl_2 \cdot 4H_2O$ and 0.2 g./liter of $CaCO_3$ are added to this solution which is then stirred at 95° C. while air is passed through it, with the following results:

| | $Fe_2O_3$-contents (g./liter) | Mn-contents (g./liter) |
|---|---|---|
| After 1 hour stirring | 0.0053 | 0.0015 |
| After 2 hours stirring | 0.0040 | 0.0013 |
| After 3 hours stirring | 0.0033 | 0.0012 |

90% of the soluble iron was removed during this operation with a final content of 20 p.p.m. of $Fe_2O_3$, based on alumina. This example shows, by comparison with Example 5, that dilution of the aluminate solution promotes elimination of the iron, although this does involve certain limitations insofar as it is necessary to avoid hydrolysis of the sodium aluminate.

EXAMPLE 8

Ferro-manganese dusts accumulated in the throats of blast furnaces were used as the manganese source. Their manganese content is around 20% by weight. The composition of the aluminate solution treated was as follows:

| | G./liter |
|---|---|
| Caustic $Na_2O$ | 161 |
| $Al_2O_3$ | 177 |
| $Fe_2O_3$ in solution | 0.023 |

Four tests were carried out, a different quantity of manganese being introduced on each occasion. The solution was kept at 95° C., oxidation being initiated by the introduction of oxygen.

| Tests | a (g./l.) | b (g./l.) | c (g./l.) | d (g./l.) |
|---|---|---|---|---|
| $CaCO_3$ | 0.200 | 0.200 | 0.200 | 0.200 |
| Manganese reactant | 0.800 | 0.600 | 0.400 | 0.200 |
| Approx. Mn content | 0.160 | 0.120 | 0.080 | 0.040 |
| $Fe_2O_3$-content: | | | | |
| After 1 hour | 0.0075 | 0.011 | 0.0133 | 0.016 |
| After 2 hours | 0.004 | 0.0057 | 0.0087 | 0.014 |
| Mn-content: | | | | |
| After 1 hour | 0.0013 | 0.0012 | 0.0010 | 0.0016 |
| After 2 hours | 0.0012 | 0.0010 | 0.0012 | 0.0009 |

This example demonstrates that purification is somewhat more in proportion to the quantity of manganese used. With this particular type of reactant, the effectiveness of the operation falls off rapidly when the manganese content drops below about 0.04 g./liter.

EXAMPLE 9

The starting material used is a solution of sodium aluminate taken before hydrolysis from a factory producing alumina by the Bayer process, having the following composition:

| | G./liter |
|---|---|
| Caustic $Na_2O$ | 160 |
| $Al_2O_3$ | 173 |
| $Fe_2O_3$ (soluble) | 0.0255 |
| $TiO_2$ | 0.0029 |

Two 2-liter samples are taken, one of which (A) is used solely for comparison, with nothing added to it. 0.69 g. of $MnCl_2 \cdot 4H_2O$ and 0.4 g. of $CaCO_3$ are added to the other sample (B). The two solutions are heated to 95° C. over a period of 2 hours during which air is passed through them, and are then filtered. Analysis shows that the composition of solution A has not undergone any change, while the composition of solution B has the following analysis:

Caustic $Na_2O$—160 g./liter
$Al_2O_3$—173 g./liter
$Fe_2O_3$ (soluble)—0.0045 g./liter
$TiO_2$—<0.0001 g./liter (indeterminable)

The two samples are then hydrolyzed for 96 hours at 50° C. in the presence of a starter taken from a previous operation and containing 46 grams of dry aluminum hydroxide containing 0.002% of $Fe_2O_3$ but no titanium.

Following hydrolysis, the residual liquid and all the hydroxide containing the starter and the precipitated alumina were separated by filtration. The mother liquor and the hydroxide washed and dried at 100° C. were separately analyzed.

| Filtered solution, 2 liters | Solution (A), Control in g./liter | Solution (B), Treated in g./liter |
|---|---|---|
| $Na_2O$ | 169.5 | 170 |
| $Al_2O_3$ | 102 | 102 |
| $Fe_2O_3$ | 0.0025 | 0.0025 |
| $TiO_2$ | (¹) | (¹) |
| $Al(OH)_3$-precipitate: | | |
| $Al_2O_3$ in percent by weight | 64.9 | 65.25 |
| $Fe_2O_3$ in percent by weight | 0.019 | 0.0021 |
| $TiO_2$ | 0.0022 | (¹) |

¹Indeterminable.

This example shows that, while removing the iron, the process according to the invention provides for the complete precipitation of the titanium present in the industrial sodium aluminate solutions.

All these examples show that the process of the invention provides remarkably consistent results. In every case, the quantity of manganese salt corresponding to less than 0.1 g. of manganese per liter of solution, i.e. about 0.6 g. per kg. of alumina $Al_2O_3$ in solution, reduces the $Fe_2O_3$ content from 250 to less than 30 p.p.m. in the alumina.

As used herein, the terms iron, titanium, lead, etc. refer to the ions of the metals as distinguished from the pure metal.

It will be understood that changes may be made in the details of materials and procedure without departing from the spirit of the invention, especially as defined in the following claim.

What is claimed is:
1. A process for purification of sodium aluminate liquors containing iron and/or titanium as impurities comprising the steps of introducing into all or part of the liquor a solution containing ions of manganese having a valence less than 4, introducing an oxidizing agent into the liquor to convert the manganese to a valance of 4 as a manganese dioxide while in the sodium aluminate liquor, exposing the aluminate liquor to the manganese dioxide converted in its presence for interaction to convert iron and/or titanium present in the liquor to an insoluble compound, and removing the insoluble reaction products that are formed, said manganese dioxide being present in the aluminate liquor for interaction in an amount greater than

0.3 gram per liter of liquor and which includes the addition of 0.1 to 0.3 gram per liter of calcium carbonate to the liquor in which the manganese dioxide is suspended.

References Cited

UNITED STATES PATENTS

| | | | |
|---|---|---|---|
| 328,478 | 10/1885 | Freist | 23—141 |
| 1,919,308 | 7/1933 | Stauf | 23—63 X |
| 2,375,343 | 5/1945 | Brown | 23—52 X |
| 2,591,436 | 4/1952 | James | 23—52 |
| 2,885,261 | 5/1959 | Adams et al. | 23—143 |
| 3,301,695 | 1/1967 | Mercade | 23—143 X |

HERBERT T. CARTER, Primary Examiner

U.S. Cl. X.R.

23—143